(12) United States Patent
Acharya et al.

(10) Patent No.: US 12,298,228 B2
(45) Date of Patent: May 13, 2025

(54) OPTICAL SYSTEM AND OPTICAL CONSTRUCTION

(71) Applicant: 3M INNOVATIVE PROPERTIES COMPANY, St. Paul, MN (US)

(72) Inventors: Bharat R. Acharya, Woodbury, MN (US); John A. Wheatley, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 242 days.

(21) Appl. No.: 18/186,363

(22) Filed: Mar. 20, 2023

(65) Prior Publication Data

US 2023/0314307 A1    Oct. 5, 2023

Related U.S. Application Data

(60) Provisional application No. 63/324,708, filed on Mar. 29, 2022.

(51) Int. Cl.
*G01N 21/17*    (2006.01)
*G01N 21/01*    (2006.01)

(52) U.S. Cl.
CPC ..... *G01N 21/17* (2013.01); *G01N 2021/0106* (2013.01)

(58) Field of Classification Search
CPC .................. G01N 21/17; G01N 2021/0106
See application file for complete search history.

(56) References Cited

U.S. PATENT DOCUMENTS

| 5,448,404 | A | 9/1995 | Schrenk et al. |
| 5,568,316 | A | 10/1996 | Schrenk et al. |
| 8,534,849 | B2 * | 9/2013 | Coggio .................. G02B 5/124 |
| | | | 359/530 |
| 2003/0092034 | A1 | 5/2003 | Cooper et al. |

* cited by examiner

*Primary Examiner* — Kevin K Pyo
(74) *Attorney, Agent, or Firm* — Jonathan L. Tolstedt

(57) ABSTRACT

An optical construction includes a first chamber including one or more first walls disposed inside a second chamber including one or more second walls. The first chamber includes a first top and an opposite closed first bottom. The second chamber includes an open second top proximate the open first top and an opposite second bottom proximate the closed first bottom. At least a portion of the one or more second walls includes a plurality of microlayers numbering at least 20 in total. The at least the portion of the one or more second walls faces, and is spaced apart by a non-zero gap from, a corresponding at least a portion of the one or more first walls. The non-zero gap is filled with a material having a lower index of refraction than at least an outermost surface of the at least the portion of the one or more second walls.

15 Claims, 9 Drawing Sheets

OPTICAL SYSTEM AND OPTICAL CONSTRUCTION

TECHNICAL FIELD

The present disclosure relates to an optical construction and an optical system including the optical construction.

BACKGROUND

In some cases, optical methods are implemented for detection of target analytes in a test sample. For example, presence of the target analytes may alter one or more optical characteristics of a light. Typically, the light emerging from the test sample containing the target analytes has a lower optical intensity compared to that from the sample without the target analyte.

SUMMARY

In a first aspect, the present disclosure provides an optical system including an optical illumination system. The optical illumination system includes at least one lightguide, a light source, a back reflector, and an emission surface. The light source is disposed proximate a minor surface of the at least one lightguide and is configured to emit light having at least a first wavelength. The back reflector is disposed proximate a first major surface of the at least one lightguide. The emission surface is disposed proximate a second, opposite the first, major surface of the at least one lightguide. The emitted light exits the optical illumination system through the emission surface of the optical illumination system. The optical system further includes a cavity disposed on the emission surface of the optical illumination system. The cavity includes a cavity wall extending between opposite first and second open ends of the cavity. The first open end faces the emission surface and is substantially covered by the back reflector. The optical system further includes an optical well disposed inside the cavity. The optical well includes a bottom wall portion facing the back reflector, an open top portion proximate the second open end of the cavity, and one or more sidewall portions extending upwardly from the bottom wall portion to the open top portion of the optical well. The one or more sidewall portions and the cavity wall face each other and define a non-zero minimum gap therebetween. The bottom wall portion and the one or more sidewall portions define a chamber for receiving a test sample. The test sample is configured to receive at least a portion of the light exiting the optical illumination system through the emission surface and at least absorb a portion of the received light. The optical system further includes a front reflector disposed on the cavity and substantially covering the second open end of the cavity and the open top portion of the optical well. For a substantially normally incident light having the first wavelength, each of the bottom wall portion and the one or more sidewall portions of the optical well has an optical transmittance of greater than about 60% and each of the back reflector and the cavity wall has an optical reflectance of greater than about 60%.

In a second aspect, the present disclosure provides an optical construction including a first optical component and a second optical component. The first optical component includes a plurality of spaced apart first optical cavities arranged at least one-dimensionally. The first optical cavities include first open tops at a same top side of the first optical component and opposing first bottoms at a same bottom, opposite the top, side of the first optical component. The first optical cavities further include one or more first sidewalls extending from the first bottoms to the first open tops. The second component includes a plurality of spaced apart second optical cavities. The second optical cavities include second open tops at a same top side of the second optical component and opposing second closed bottoms at a same bottom, opposite the top, side of the second optical component. The second optical cavities further include one or more second sidewalls extending from the second closed bottoms to the second open tops. The second optical component is removably assembled to the first optical component so that the second optical cavities are inserted into the first optical cavities in a one-to-one correspondence. For each corresponding first and second optical cavities, the second open top of the second optical cavity is adjacent the first open top of the first optical cavity, the second closed bottom of the second optical cavity faces the first bottom of the first optical cavity, and the one or more second sidewalls of the second optical cavity and the one or more first sidewalls of the first optical cavity face each other and define a non-zero minimum gap therebetween.

In a third aspect, the present disclosure provides an optical system including the optical construction of the second aspect disposed on, and substantially co-extensive with, an emission surface of an optical illumination system. The first bottoms and the second closed bottoms are disposed between the emission surface and the first and second open tops. The illumination system is configured to inject light into the second optical cavities through the emission surface.

In a fourth aspect, the present disclosure provides an optical construction. The optical construction includes a first chamber including one or more first walls disposed inside a second chamber including one or more second walls. The first chamber includes a first top and an opposite closed first bottom. The second chamber includes an open second top proximate the open first top and an opposite second bottom proximate the closed first bottom. At least a portion of the one or more second walls includes a plurality of microlayers numbering at least 20 in total. Each of the microlayers has an average thickness of less than about 500 nanometers (nm). The at least the portion of the one or more second walls faces, and is spaced apart by a non-zero gap from, a corresponding at least a portion of the one or more first walls. The non-zero gap is substantially filled with a material having a lower index of refraction than at least an outermost surface of the at least the portion of the one or more second walls.

In a fifth aspect, the present disclosure provides an optical construction. The optical construction includes an integral material shaped to include a plurality of first chambers and assembled to a plurality of second chambers so that the first chambers are at least partially disposed inside the second chambers in a one-to-one correspondence. The first chambers include open first tops and opposing closed first bottoms. The first chambers further include a cover extending across and substantially closing the open first tops of the first chambers. The second chambers include open second tops proximate corresponding open first tops, opposing second bottoms proximate corresponding closed first bottoms, and one or more sidewalls extending from the second bottoms to the open second tops. The one or more sidewalls of at least one of the second chambers define an opening therein between the open second top and the second bottom of the second chambers, such that for a substantially normally incident light, for at least first and second wavelengths, and for at least a first polarization state, each of the integral material and the opening in the one or more sidewalls of the at least one of the second chambers has an optical transmittance of greater than about 60% at each of the first and second wavelengths, and each of the cover and the one or more sidewalls of the second chambers has an optical reflectance of greater than about 60% at each of the first and second wavelengths.

In a sixth aspect, the present disclosure provides an optical system including the optical construction of the fifth aspect. The optical system further includes an illumination system configured to emit light having the first wavelength and configured to enter the at least one of the second chambers and the corresponding first chamber. The optical system further includes a detector configured to detect light from, and transmitted by, the first chamber after it passes through the opening in the one or more sidewalls of the at least one of the second chambers.

BRIEF DESCRIPTION OF DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
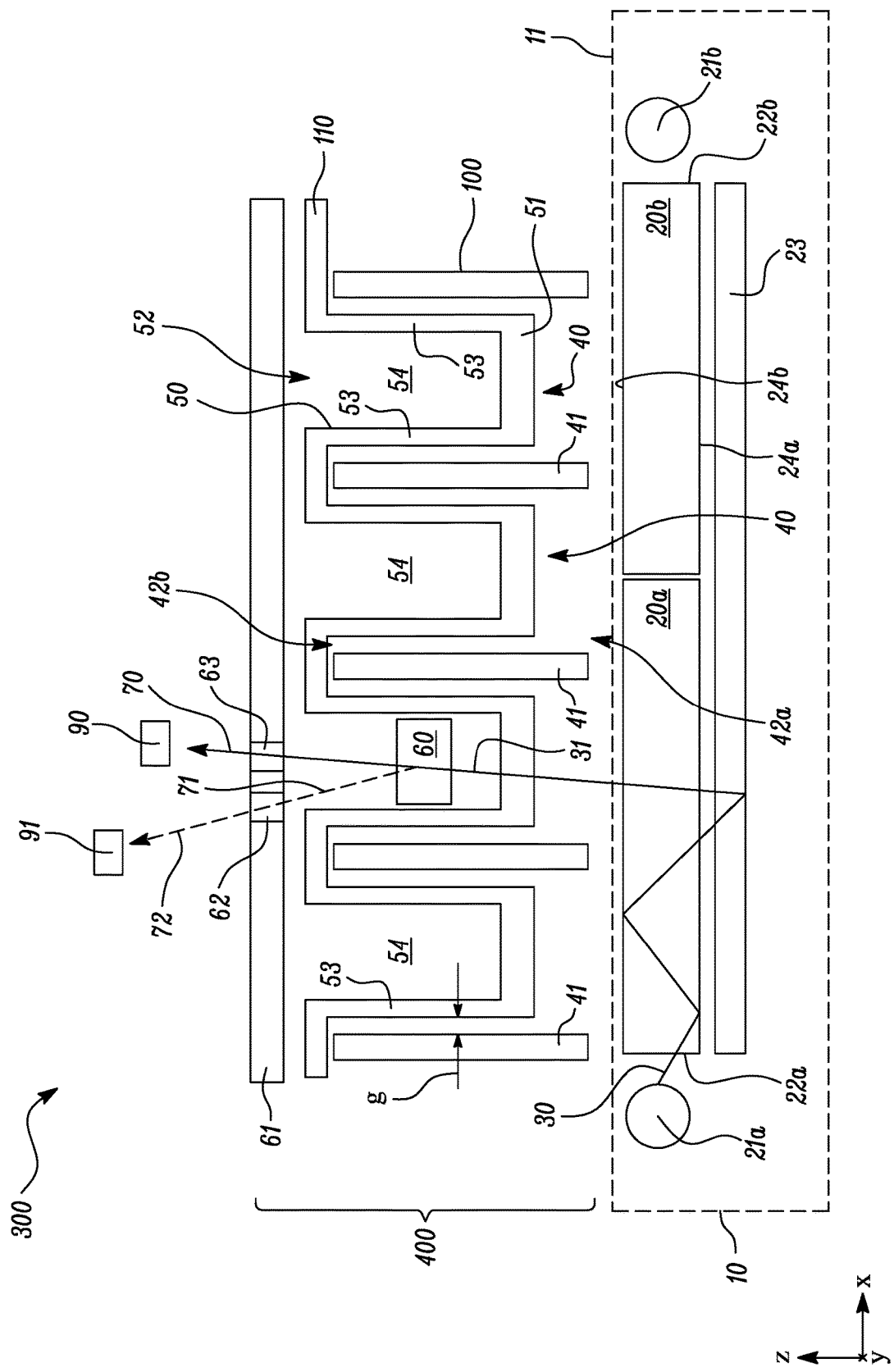
FIG. 1 illustrates a schematic sectional side view of an optical system, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first", "second" and "third" are used as identifiers. Therefore, such terms should not be construed as limiting of this disclosure. The terms "first", "second" and "third", when used in conjunction with a feature or an element can be interchanged throughout the embodiments of this disclosure.

As used herein, "at least one of A and B" should be understood to mean "only A, only B, or both A and B".

As used herein, the term "between about", unless otherwise specifically defined, generally refers to an inclusive or a closed range. For example, if a parameter X is between about A and B, then A≤X≤B.

As used herein, the term "film" generally refers to a material with a very high ratio of length or width to thickness. A film has two major surfaces defined by a length and width. A minor surface of a film extends between the two major surfaces along the thickness of the film. Films typically have good flexibility and can be used for a wide variety of applications, including displays. Films may also be of thickness or material composition, such that they are semi-rigid or rigid. Films described in the present disclosure may be composed of various polymeric materials. Films may be monolayer, multilayer, or blend of different polymers.

As used herein, the term "layer" generally refers to a thickness of material within a film that has a relatively consistent chemical composition. Layers may be of any type of material including polymeric, cellulosic, metallic, or a blend thereof. A given polymeric layer may include a single polymer-type or a blend of polymers and may be accompanied by additives. A given layer may be combined or connected to other layers to form films. A layer may be either partially or fully continuous as compared to adjacent layers or the film. A given layer may be partially or fully coextensive with adjacent layers. A layer may contain sub-layers.

Various optical detection devices and methods are used for detecting or sensing a presence of an analyte. Specifically, it may be important to detect or sense target analytes. One of the conventional techniques for detecting the target analytes is an optical technique. In such a technique, the target analyte may be applied onto a test material, which may include a photoluminescent material. The photoluminescent material may be subjected to a stimulus, such as an optical stimulus. Optical stimulus may include an incident light. A portion of the incident light may be absorbed by the test material, after which, the test material may emit an emitted light having a specific wavelength. In cases where the optical stimulus is used, the wavelength of the emitted light may be different from a wavelength of the incident light.

The sensitivity of detection of the target analyte may depend on the utilization of the incident light by molecules of the target analyte. The extent of utilization of the incident light may further relate to an optical intensity of the emitted light by the test material. In some cases, greater the utilization of the incident light by the test material, greater may be the optical intensity of the emitted light. Further, a greater optical intensity of the emitted light may facilitate a better detection of the emitted light.

However, conventional sources of light may generate light having a low optical intensity. Further, not all the light from the sources of light may be adequately absorbed by the test material. Due to the low absorption of the light by the test material, the emitted light may also have a low optical intensity. Therefore, in some cases, the test material may be disposed in a recycling optical cavity to improve or enhance absorption of the light by the test material and to improve or enhance the optical intensity of the emitted light for better detection of the emitted light by the optical detector.

Typically, the recycling optical cavities are formed using optical films, such as Multilayer Optical Films (MOFs), to obtain desired optical properties. However, forming the optical films into three-dimensional (3D) shapes, especially into 3D shapes requiring high draw ratios, may be challenging and may result in various deformities of the optical films, such as thinning of the optical films. Therefore, optical properties of the optical films may be negatively affected, for example, first order reflective band(s) of the optical films may shift.

In one aspect, the present disclosure provides an optical system including an optical illumination system. The optical illumination system includes at least one lightguide, a light source, a back reflector, and an emission surface. The light source is disposed proximate a minor surface of the at least one lightguide and is configured to emit light having at least a first wavelength. The back reflector is disposed proximate a first major surface of the at least one lightguide. The emission surface is disposed proximate a second, opposite the first, major surface of the at least one lightguide. The emitted light exits the optical illumination system through the emission surface of the optical illumination system. The optical system further includes a cavity disposed on the emission surface of the optical illumination system. The cavity includes a cavity wall extending between opposite first and second open ends of the cavity. The first open end faces the emission surface and is substantially covered by the back reflector. The optical system further includes an optical well disposed inside the cavity and including a bottom wall portion facing the back reflector, an open top portion proximate the second open end of the cavity, and one or more sidewall portions extending upwardly from the bottom wall portion to the open top portion of the optical well. The one or more sidewall portions and the cavity wall face each other and define a non-zero minimum gap therebetween. The bottom wall portion and the one or more sidewall portions define a chamber for receiving a test sample. The test sample is configured to receive at least a portion of the light exiting the optical illumination system through the emission surface and at least absorb a portion of the received light. The optical system further includes a front reflector disposed on the cavity and substantially covering the second open end of the cavity and the open top portion of the optical well. For a substantially normally incident light having the first wavelength, each of the bottom wall portion and the one or more sidewall portions of the optical well has an optical transmittance of greater than about 60% and each of the back reflector and the cavity wall has an optical reflectance of greater than about 60%.

Generally, the optical well is made of a material exhibiting high optical transmittance and low optical absorption for the first light having the first wavelength. For example, the material may include one or more of polymers, such as polystyrene. Further, such materials may be easily formable into 3D shapes via manufacturing processes, such as thermoforming, embossing, and molding, for example, injection molding. In some cases, the optical well may be formed by attaching a thin high optical quality glass plate with a cylinder. The cylinder may include polymers, such as polyethylene terephthalate (PET). In some cases, the optical well may be a glass bottom well plate. Specifically, the bottom wall portion of the optical well may include the thin high optical quality glass plate and the one or more sidewall portions may be cylindrical and may include the polymers. The optical well may therefore be configured to receive the test sample. Since, the optical well is disposed inside the cavity, the cavity wall of the cavity may include the optical films configured to impart the desired optical reflectance properties for recycling a light within the cavity. Specifically, the cavity wall and the back reflector may form a recycling optical cavity for recycling the light.

This may improve or enhance absorption of the light by the test sample and also improve or enhance the optical intensity of light emitted by the test sample for better detection by an optical detector.

Further, the front reflector disposed on the cavity and substantially covering the second open end of the cavity and the open top portion of the optical well may further facilitate the recycling of the light. This may further enhance the absorption of the light by the test sample and the optical properties of the portion of the light emitted by the test sample for better detection by the optical detector.

Further, as the optical well is configured to receive the test sample and is disposed inside the cavity, to achieve light recycling, the optical well may not be required to be formed using the optical films into the 3D shapes, especially into the 3D shapes requiring high draw ratios, which may otherwise result in various deformities of the optical films.

Therefore, the optical system of the present disclosure may facilitate diagnostic testing for detection of target analytes in the test samples and provide various benefits by recycling a light (i.e., enhancement in utilization or absorption of the light by the test sample and improvement or enhancement in the optical intensity of the light emitted by the test sample) inside a cavity.

In addition, the non-zero minimum gap defined between the one or more sidewall portions and the cavity wall may prevent an optical coupling between the one or more sidewall portions of the optical well and the cavity wall, which may otherwise lead to undesirable optical effects. The non-zero minimum gap is generally filled with air or a material having a lower index of refraction than an outermost surface of the cavity wall.

Moreover, the optical well may be discarded after the test sample is analyzed and the cavity may be reused with a different optical well for a next cycle of tests.

Referring now to figures, FIG. 1 illustrates a detailed schematic sectional side view of an optical system 300, according to an embodiment of the present disclosure. The optical system 300 defines mutually orthogonal x-, y-, and z-axes. The x- and y-axes correspond to in-plane axes of the optical system 300, while the z-axis is a transverse axis disposed along a thickness of the optical system 300. In other words, the x-y plane defines the plane of the optical system 300, and the z-axis is perpendicular to the plane of the optical system 300, i.e., along the thickness of the optical system 300.

The optical system 300 includes an optical illumination system 10. The optical illumination system 10 may be interchangeably referred to as "the illumination system 10". The optical illumination system 10 includes at least one lightguide. In the illustrated embodiment of FIG. 1, the optical illumination system 10 includes two lightguides, i.e., a first lightguide 20a and a second lightguide 20b. The first lightguide 20a and the second lightguide 20b may be collectively referred to as "the at least one lightguide 20a, 20b". In some embodiments, at least one of the at least one lightguide 20a, 20b is an optical waveguide. In some embodiments, at least one of the at least one lightguide 20a, 20b is an optical fiber. In some embodiments, at least one of the at least one lightguide 20a, 20b is a solid lightguide. In some embodiments, at least one of the at least one lightguide 20a, 20b is a substantially hollow lightguide. In some embodiments, at least one of the at least one lightguide 20a, 20b may be a step wedge lightguide.

The optical illumination system 10 further includes a light source 21a, 21b disposed proximate a minor surface 22a, 22b of the at least one lightguide 20a, 20b. In the illustrated embodiment of FIG. 1, the optical illumination system 10 includes two light sources, i.e., a first light source 21a and a second light source 21b. Further, the first light source 21a is disposed proximate the minor surface 22a of the first lightguide 20a and the second light source 21b is disposed proximate the minor surface 22b of the second lightguide 20b. Therefore, the optical illumination system 10 has an edge lit configuration. However, in some other embodiments, the optical illumination system 10 may have a backlit configuration, i.e., the light source 21a, 21b may be disposed proximate a first major surface 24a of the at least one lightguide 20a, 20b.

The light source 21a, 21b is configured to emit light 30 having at least a first wavelength. In some embodiments, at least one of the first light source 21a and the second light source 21b is configured to emit the light 30 having at least the first wavelength. In some embodiments, each of the first light source 21a and the second light source 21b is configured to emit the light 30 having at least the first wavelength.

The optical illumination system 10 further includes a back reflector 23 disposed proximate the first major surface 24a of the at least one lightguide 20a, 20b. In some embodiments, the back reflector 23 includes a metal layer. In some embodiments, the metal layer includes one or more of silver, gold, aluminum, and titanium.

The optical illumination system 10 further includes an emission surface 11 disposed proximate a second major surface 24b, opposite the first major surface 24a of the at least one lightguide 20a, 20b. The emitted light 30 exits the optical illumination system 10 through the emission surface 11 of the optical illumination system 10. In some embodiments, the at least one lightguide 20a, 20b is disposed between the emission surface 11 and the back reflector 23.

In some embodiments, the optical illumination system 10 may further include other films/layers (not shown), such as a light redirecting film, a reflective polarizer, and/or an optical diffuser layer.

The optical system 300 further includes a cavity 40. The cavity 40 is disposed on the emission surface 11 of the optical illumination system 10. The cavity 40 may be interchangeably referred to as "the second chamber 40". The second chamber 40 includes one or more second walls 41. The second chamber 40 further includes an open second top 42b and an opposite second bottom 42a. In the illustrated embodiment of FIG. 1, the second bottom 42a is open. In such embodiments, the second bottom 42a may be interchangeably referred to as "the first open end 42a". Further, the open second top 42b may be interchangeably referred to as "the second open end 42b". Furthermore, the one or more second walls 41 may be interchangeably referred to as "the cavity wall 41".

The cavity 40 includes the cavity wall 41 extending between the opposite first and second open ends 42a, 42b of the cavity 40. The first open end 42a faces the emission surface 11 and is substantially covered by the back reflector 23.

In some embodiments, the optical system 300 includes a plurality of spaced apart cavities 40. The plurality of spaced apart cavities 40 may be interchangeably referred to as "the plurality of spaced apart first optical cavities 40". Further, the first open end 42a may be interchangeably referred to as "the first bottom 42a" and the second open end 42b may be interchangeably referred to as "the first open top 42b". Moreover, the cavity wall 41 may be interchangeably referred to as "the one or more first sidewalls 41" or "the one or more sidewalls 41". The plurality of spaced apart first optical cavities 40 is arranged at least one-dimensionally. In the illustrated embodiment of FIG. 1, the plurality of spaced apart first optical cavities 40 is arranged along the x axis. In some embodiments, the plurality of spaced apart first optical cavities 40 is arranged two-dimensionally, for example, in the x-y plane.

The optical system 300 further includes an optical well 50. The optical well 50 is disposed inside the cavity 40. In some embodiments, the optical well 50 is removably assembled to the cavity 40. The optical well 50 may be interchangeably referred to as "the first chamber 50". The first chamber 50 includes one or more first walls 53. The first chamber 50 further includes a first top 52 and an opposite closed first bottom 51. In the illustrated embodiment of FIG. 1, the first top 52 is open. In such embodiments, the first top 52 may be interchangeably referred to as "the open top portion 52" or "the open first top 52". Further, the closed first bottom 51 may be interchangeably referred to as "the bottom wall portion 51". Furthermore, the one or more first walls 53 may be interchangeably referred to as "the one or more sidewall portions 53".

The optical well 50 includes the bottom wall portion 51 facing the back reflector 23, the open top portion 52 proximate the second open end 42b of the cavity 40, and the one or more sidewall portions 53 extending upwardly from the bottom wall portion 51 to the open top portion 52 of the optical well 50. The bottom wall portion 51 and the one or more sidewall portions 53 define a chamber 54 for receiving a test sample 60. In some embodiments, the test sample 60 includes one or more of a solid material, a liquid material, and a gaseous material.

In some embodiments, the bottom wall portion 51 and the one or more sidewall portions 53 of the optical well 50 may define a plurality of spaced apart chambers 54. The plurality of spaced apart chambers 54 may be interchangeably referred to as "the plurality of spaced apart second optical cavities 54". Further, the open top portion 52 may be interchangeably referred to as "the second open top 52" and the bottom wall portion 51 may be interchangeably referred to as "the second closed bottom 51". Furthermore, the one or more sidewall portions 53 may be interchangeably referred to as "the one or more second sidewalls 53".

The test sample 60 is configured to receive at least a portion 31 of the light 30 exiting the optical illumination system 10 through the emission surface 11 and at least absorb a portion of the received light 31.

Further, the one or more sidewall portions 53 and the cavity wall 41 face each other and define a non-zero minimum gap g therebetween. The non-zero minimum gap g may be interchangeably referred to as "the non-zero gap g". In some embodiments, the non-zero minimum gap g between the one or more sidewall portions 53 and the cavity wall 41 is filled mostly with air. In some embodiments, the non-zero gap g is substantially filled with a material having a lower index of refraction than at least an outermost surface of the cavity wall 41. The non-zero minimum gap g defined between the one or more sidewall portions 53 and the cavity wall 41 may prevent an optical coupling between the one or more sidewall portions 53 of the optical well 50 and the cavity wall 41, which may otherwise lead to undesirable optical effects.

For a substantially normally incident light having the first wavelength, each of the bottom wall portion 51 and the one or more sidewall portions 53 of the optical well 50 has an optical transmittance of greater than about 60%. In some embodiments, for the substantially normally incident light having the first wavelength, each of the bottom wall portion 51 and the one or more sidewall portions 53 of the optical well 50 has the optical transmittance of greater than about 70%, greater than about 80%, or greater than about 90%. In other words, each of the bottom wall portion 51 and the one or more sidewall portions 53 of the optical well 50 substantially transmits the substantially normally incident light having the first wavelength.

Further, for the substantially normally incident light having the first wavelength, each of the back reflector 23 and the cavity wall 41 has an optical reflectance of greater than about 60%. In some embodiments, for the substantially normally incident light having the first wavelength, each of the back reflector 23 and the cavity wall 41 has the optical reflectance of greater than about 70%, greater than about 80%, greater than about 90%, greater than about 95%, greater than about 98%, or greater than about 99%. In other words, each of the back reflector 23 and the cavity wall 41 substantially reflects the substantially normally incident light having the first wavelength. In some embodiments, the back reflector 23 and/or the cavity wall 41 may include an Enhanced Specular Reflector (ESR) film available from 3M Company, St. Paul, Minn.

The optical system 300 further includes a front reflector 61. The front reflector 61 may be interchangeably referred to as "the top reflector 61" or "the cover 61". The front reflector 61 is disposed on the cavity 40 and substantially covers the second open end 42b of the cavity 40 and the open top portion 52 of the optical well 50.

In some embodiments, the optical system 300 further includes an optical construction 400. In some embodiments, the optical construction 400 is disposed on, and is substantially co-extensive with, the emission surface 11 of the optical illumination system 10. Specifically, the optical construction 400 and the emission surface 11 are substantially co-extensive with each other in length and in width. In other words, the optical construction 400 and the emission surface 11 are substantially co-extensive with each other in the x-y plane, i.e., the optical construction 400 and the emission surface 11 have substantially similar in-plane dimensions in length and in width.

The optical construction 400 includes the first chamber 50 including the one or more first walls 53. The first chamber 50 is disposed inside the second chamber 40. The second chamber 40 includes the open second top 42b proximate the open first top 52 and the second bottom 42a proximate the closed first bottom 51. In some embodiments, the second chambers 40 include the open second tops 42b proximate the corresponding open first tops 52 and the second bottoms 42a proximate the corresponding closed first bottoms 51.

Further, at least a portion of the one or more second walls 41 faces and is spaced apart by the non-zero gap g from a corresponding at least a portion of the one or more first walls 53. The non-zero gap g is substantially filled with a material having a lower index of refraction than at least an outermost surface of the at least the portion of the one or more second walls 41. In some embodiments, the material is air.

Figure 2:
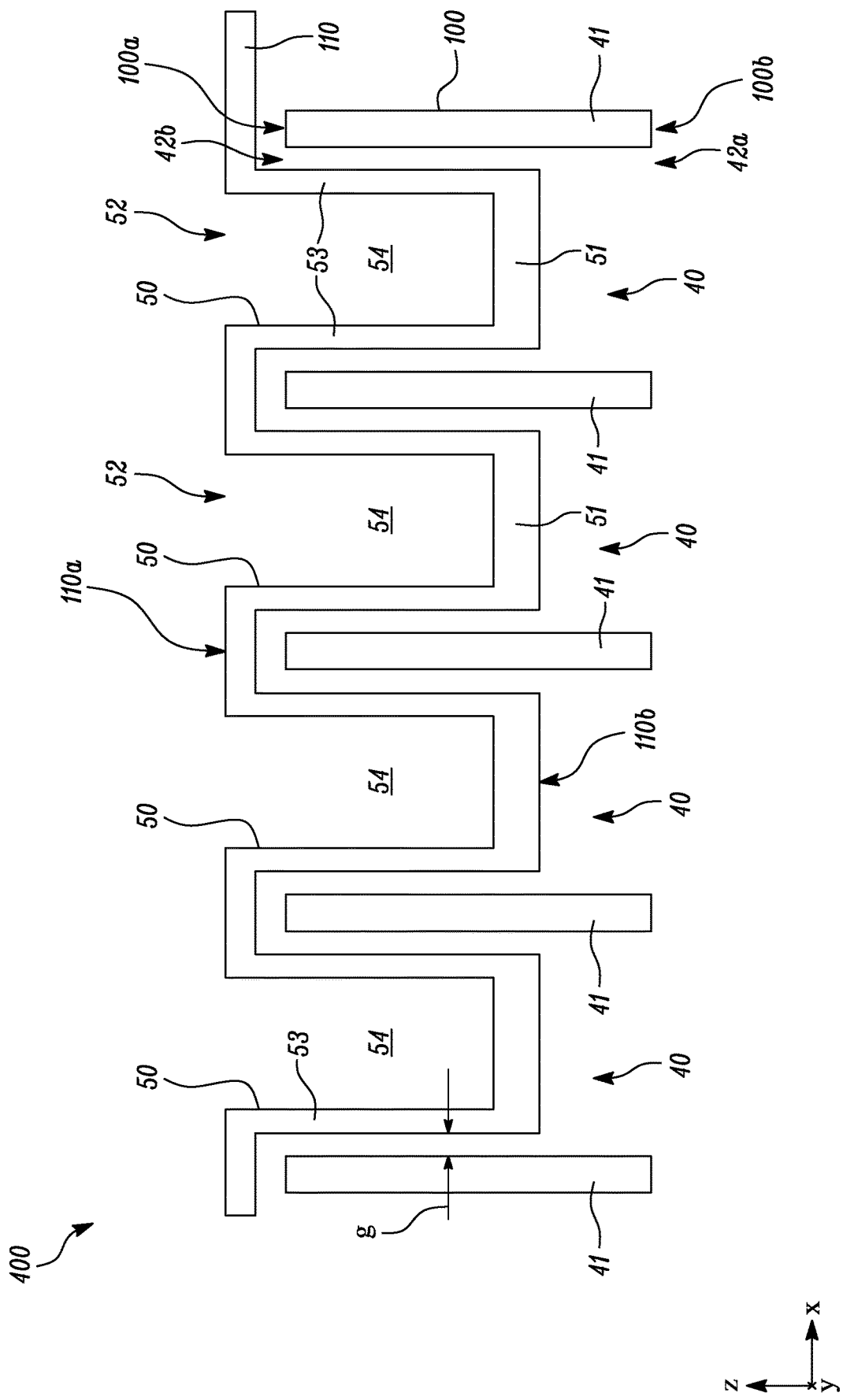
FIG. 2 illustrates a schematic sectional side view of an optical construction of the optical system, according to an embodiment of the present disclosure.

The optical construction 400 is shown in greater detail in FIG. 2.

FIG. 2 illustrates a schematic sectional side view of the optical construction 400 of the optical system 300 shown in FIG. 1, according to an embodiment of the present disclosure.

Referring to FIGS. 1 and 2, the optical construction 400 includes a first optical component 100. The first optical component 100 has a top side 100a and a bottom side 100b opposite to the top side 100a. The first optical component 100 includes the plurality of spaced apart first optical cavities 40. The plurality of spaced apart first optical cavities 40 includes the first open tops 42b at a same top side 100a of the first optical component 100. The plurality of spaced apart first optical cavities 40 further includes the opposing first bottoms 42a at a same bottom side 100b of the first optical component 100. The plurality of spaced apart first optical cavities 40 further includes the one or more first sidewalls 41 extending from the first bottoms 42a to the first open tops 42b.

The optical construction 400 further includes a second optical component 110. The second optical component 110 has a top side 110a and a bottom side 110b opposite to the top side 110a. The second optical component 110 includes the plurality of spaced apart second optical cavities 54. The plurality of spaced apart second optical cavities 54 includes the second open tops 52 at a same top side 110a of the second optical component 110. The plurality of spaced apart second optical cavities 54 further includes the opposing second closed bottoms 51 at a same bottom side 110b of the second optical component 110. The plurality of spaced apart second optical cavities 54 further includes the one or more second sidewalls 53 extending from the second closed bottoms 51 to the second open tops 52.

In some embodiments, the second optical component 110 may include an integral material shaped to include a plurality of the first chambers 50. In such embodiments, the second optical component 110 may be interchangeably referred to as "the integral material 110". In some embodiments, the integral material 110 may be shaped to include the plurality of first chambers 50 via any suitable method, such as thermoforming, embossing, and molding, for example, injection molding.

The second optical component 110 is removably assembled to the first optical component 100 so that the second optical cavities 54 are inserted into the first optical cavities 40 in a one-to-one correspondence. In some cases, the second optical component 110 may be discarded after the test samples 60 disposed in one or more of the second optical cavities 54 have been analyzed and the first optical component 100 may be reused with a different second optical component 110 for next cycle of tests.

For each corresponding first and second optical cavities 40, 54, the second open top 52 of the second optical cavity 54 is adjacent the first open top 42b of the first optical cavity 40. Further, for each corresponding first and second optical cavities 40, 54, the second closed bottom 51 of the second optical cavity 54 faces the first bottom 42a of the first optical cavity 40. Furthermore, for each corresponding first and second optical cavities 40, 54, the one or more second sidewalls 53 of the second optical cavity 54 and the one or more first sidewalls 41 of the first optical cavity 40 face each other and define the non-zero minimum gap g therebetween.

The first bottoms 42a and the second closed bottoms 51 are disposed between the emission surface 11 and the first and second open tops 42b, 52. Further, the illumination system 10 is configured to inject the light 31 (i.e., the portion of the light 30) into the second optical cavities 54 through the emission surface 11.

In some embodiments, the optical construction 400 further includes the top reflector 61. The top reflector 61 is disposed at the top side 110a of the second optical component 110 and covers the second optical cavities 54 and substantially covers the first and second open tops 42b, 52.

Referring again to FIG. 1, in some embodiments, the optical system 300 further includes an optical detector 90. The optical detector 90 may be interchangeably referred to as "the detector 90". In some embodiments, the optical detector 90 includes one or more of an array of photodiodes, a charged coupled device (CCD), a charge injection device (CID), a photodiode, an organic photodiode, a complementary metal-oxide-semiconductor (CMOS), and a thin-film transistor (TFT). In some other embodiments, the optical detector 90 may be a human eye.

The optical detector 90 is configured to detect a portion 70 of the light 30 exiting the optical illumination system 10 through the emission surface 11 and transmitted by the test sample 60 and the front reflector 61.

In some embodiments, for the substantially normally incident light having the first wavelength, the front reflector 61 has an optical transmittance of greater than about 60%. In some embodiments, for the substantially normally incident light having the first wavelength, the front reflector 61 has the optical transmittance of greater than about 70%, greater than about 80%, greater than about 90%, greater than about 95%, greater than about 98%, or greater than about 99%.

In some other embodiments, for the substantially normally incident light having the first wavelength, the front reflector 61 has an optical reflectance of greater than about 60%. In some embodiments, for the substantially normally incident light having the first wavelength, the front reflector 61 has the optical reflectance of greater than about 70%, greater than about 80%, greater than about 90%, greater than about 95%, greater than about 98%, or greater than about 99%.

In such embodiments, the front reflector 61 transmits the portion 70 of the light 30 exiting the optical illumination system 10 through an opening 63 defined therein. In some embodiments, the front reflector 61 may define multiple openings 63 therein. In some embodiments, the opening 63 may be an optical opening. In some other embodiments, the opening 63 may be a physical opening. Further, the opening 63 may be substantially rectangular, substantially square, substantially circular, or may be otherwise substantially polygonal.

The portion 70 of the second light 30 exits the optical system 300 through the opening 63 of the front reflector 61 after being recycled between the cavity wall 41, the back reflector 23, and the front reflector 61.

In some embodiments, for the substantially normally incident light having the first wavelength, at least one of the back reflector 23, the cavity wall 41, and the front reflector 61 has a diffuse optical reflectance of greater than about 30%. In some embodiments, at least one of the back reflector 23, the cavity wall 41, and the front reflector 61 has the diffuse optical reflectance of greater than about 40%, greater than about 50%, greater than about 60%, greater than about 70%, greater than about 80%, greater than about 90%, greater than about 95%, greater than about 98%, or greater than about 99%.

In some embodiments, the test sample 60 is further configured to convert at least a portion of the received light 31 to a second light 71 having at least a second wavelength different from the first wavelength. In some embodiments, at least one of the first and second wavelengths is between about 420 nanometer (nm) and about 700 nm. In other words, at least one of the first and second wavelengths may lie in a visible wavelength range. In some embodiments, at least one of the first and second wavelengths is less than about 420 nm. In other words, at least one of the first and second wavelengths may lie in an ultraviolet range. In some embodiments, at least one of the first and second wavelengths is greater than about 700 nm. In other words, at least one of the first and second wavelengths may lie in an infrared range.

In some embodiments, the test sample 60 may include a photoluminescent material. The photoluminescent material absorbs a photon, excites one of its electrons to a higher electronic excited state, and then radiates a photon as the electron returns to a lower energy state. In other words, the photoluminescent material emits a light after absorption of photons of an incident light. Such a phenomenon is known as photoluminescence. Generally, the emitted light has a wavelength different from a wavelength of the incident light.

In some embodiments, the photoluminescent material may include quantum dots. When a quantum dot is irradiated with an incident light, electrons in the quantum dot are excited to a higher state, and upon return of the electrons to an original state, an excess energy possessed by the electrons is released as an emitted light. Wavelength of the emitted light depends on wavelength of the incident light and an energy gap between the original state and the higher state. The energy gap, in turn, depends on a size of the quantum dot. By varying the size of the quantum dot, for a given wavelength of the incident light, wavelength of the emitted light may be controlled. In some embodiments, quantum dots may be used for down-conversion fluorescence or for up-conversion fluorescence.

In some embodiments, the photoluminescent material may include one or more of a fluorescent material and a phosphorescent material. When subjected to an incident light, the fluorescent material exhibits fluorescence, and the phosphorescent material exhibits phosphorescence. Fluorescence may be relatively a fast process, and some amount of energy may be dissipated or absorbed during the process so that re-emitted light has an energy different from the absorbed incident light. In phosphorescence, the phosphorescent material may not immediately re-emit the absorbed incident light. Phosphorescence is emission of light from triplet-excited states, in which the electron in the excited orbital has the same spin orientation as the ground-state electron. Transitions to the ground state are spin-forbidden, and the emission rates are relatively slow. The result may be a slow process of radiative transition back to the singlet state, sometimes lasting from milliseconds to seconds to minutes.

In some embodiments, the first wavelength may be lesser than the second wavelength. In other words, the first wavelength of the light 30 may be lesser than the second wavelength of the second light 71. Thus, the energy of the photons corresponding to the light 30 is greater than the energy of the photons corresponding to the second light 71. Such a phenomenon may be referred to as down-conversion fluorescence. When the test sample 60 exhibits down-conversion fluorescence, an amount of energy may be absorbed by the test sample 60 during fluorescence, such that the photons corresponding to the second light 71 has a lower energy than the photons corresponding to the light 30.

In some other embodiments, the first wavelength may be greater than the second wavelength. In other words, the first wavelength of the light 30 may be greater than the second wavelength of the second light 71. Thus, the energy of the photons corresponding to the light 30 may be lower than the energy of the photons corresponding to the second light 71. Such a phenomenon may be referred to as up-conversion fluorescence, where the test sample 60 may absorb the light 30 and may emit the second light 71 such that the photons corresponding to the second light 71 has a higher energy than the photons corresponding to the light 30.

In some embodiments, the front reflector 61 further transmits at least a portion 72 of the second light 71. In some embodiments, the front reflector 61 transmits at least the portion 72 of the second light 71 through an opening 62 defined therein.

In some cases, the portion 72 of the second light 71 exits the optical system 300 through the opening 62 of the front reflector 61 after being recycled between the cavity wall 41, the back reflector 23, and optionally the front reflector 61.

In some embodiments, the front reflector 61 may define multiple openings 62 therein. In some embodiments, the opening 62 may be an optical opening. In some other embodiments, the opening 62 may be a physical opening. Further, the opening 62 may be substantially rectangular, substantially square, substantially circular, or may be otherwise substantially polygonal.

In some embodiments, for a substantially normally incident light having the at least the second wavelength, each of the bottom wall portion 51 and the one or more sidewall portions 53 of the optical well 50 and the front reflector 61, has an optical transmittance of greater than about 60%. In some embodiments, for the substantially normally incident light having the at least the second wavelength, each of the bottom wall portion 51 and the one or more sidewall portions 53 of the optical well 50 and the front reflector 61, has the optical transmittance of greater than about 70%, greater than about 80%, or greater than about 90%. Therefore, each of the bottom wall portion 51 and the one or more sidewall portions 53 of the optical well 50 and the front reflector 61 substantially transmits the substantially normally incident light having the second wavelength.

In some other embodiments, for the substantially normally incident light having the second wavelength, the front reflector 61 has an optical reflectance of greater than about 60%. In some embodiments, for the substantially normally incident light having the second wavelength, the front reflector 61 has the optical reflectance of greater than about 70%, greater than about 80%, greater than about 90%, greater than about 95%, greater than about 98%, or greater than about 99%. Therefore, the front reflector 61 may substantially reflect the substantially normally incident light having the second wavelength.

Further, for the substantially normally incident light having the second wavelength, each of the back reflector 23 and the cavity wall 41 has an optical reflectance of greater than about 60%. In some embodiments, for the substantially normally incident light having the second wavelength, each of the back reflector 23 and the cavity wall 41 has the optical reflectance of greater than about 70%, greater than about 80%, greater than about 90%, greater than about 95%, greater than about 98%, or greater than about 99%. In other words, each of the back reflector 23 and the cavity wall 41 substantially reflects the substantially normally incident light having the second wavelength.

In some embodiments, the optical system 300 further includes an optical detector 91. The optical detector 91 may be interchangeably referred to as "the detector 91". The optical detector 91 is configured to detect the portion 72 of the second light 71 transmitted by the front reflector 61. In some embodiments, the optical detector 91 includes one or more of an array of photodiodes, a charged coupled device (CCD), a charge injection device (CID), a photodiode, an organic photodiode, a complementary metal-oxide-semiconductor (CMOS), and a thin-film transistor (TFT). In some other embodiments, the optical detector 91 may be the human eye.

As discussed above, each of the bottom wall portion 51 and the one or more sidewall portions 53 of the optical well 50 substantially transmits the substantially normally incident light having the first wavelength and/or the second wavelength. Therefore, the optical well 50 is made of a material exhibiting high optical transmittance and low optical absorption for the substantially normally incident light having the first wavelength and/or the second wavelength. For example, the material may include one or more of polymers, such as polystyrene. Further, such materials may be easily formable into 3D shapes via manufacturing processes, such as thermoforming, embossing, and molding, for example, injection molding. In some cases, the optical well 50 may be formed by attaching a thin high optical quality glass plate with a cylinder. The cylinder may include polymers, such as polyethylene terephthalate (PET). In some cases, the optical well 50 may be a glass bottom well plate. Specifically, the bottom wall portion 51 of the optical well 50 may include the thin high optical quality glass plate and the one or more sidewall portions 53 may be cylindrical and may include the polymers. The optical well 50 is therefore configured to receive the test sample 60.

Further, as discussed above, each of the back reflector 23 and the cavity wall 41 substantially reflects the substantially normally incident light having the first wavelength and/or the second wavelength. Since the optical well 50 is disposed inside the cavity 40, the cavity wall 41 may impart the desired optical reflectance properties for recycling a light (i.e., the portion 31 of the light 30 having the first wavelength and/or the second light 71 having the second wavelength) within the cavity 40. Specifically, the cavity wall 41 and the back reflector 23 may form a recycling optical cavity for recycling the portion 31 of the light 30. This may improve or enhance absorption of the portion 31 of the light 30 by the test sample 60 and may further enhance the optical properties of the portion 70 of the light 30 transmitted by the test sample 60 for better detection by the optical detector 90. Further, the recycling optical cavity may also recycle the second light 71 emitted by the test sample 60 to improve the optical intensity of the portion 72 of the second light 71 emitted by the test sample 60 for better detection by the optical detector 91.

Further, as the front reflector 61 is disposed on the cavity 40 and substantially covers the second open end 42b of the cavity 40 and the open top portion 52 of the optical well 50, the front reflector 61 may further facilitate the recycling of the light 30. This may further enhance the absorption of the light 30 by the test sample 60 and the optical intensity of the portion 70 of the light 30 transmitted by the test sample 60 and the front reflector 61 for better detection by the optical detector 90.

Further, as the optical well 50 is configured to receive the test sample 60 and is disposed inside the cavity 40 to achieve light recycling, the optical well 50 may not be required to be formed using the optical films into 3D shapes, especially into the 3D shapes requiring high draw ratios.

In some cases, the recycling may enhance a ratio of an optical intensity of one of the first and second lights 30, 71 to an optical intensity of the other of the first and second lights 30, 71. This may further enhance the contrast.

In addition, the second optical component 110 including the plurality of spaced apart second optical cavities 54 for receiving the test samples 60 may allow analysis of more than one test samples 60 simultaneously or sequentially using the optical illumination system 10 of the optical system 300.

Therefore, the optical system 300 may provide various benefits by recycling the light 30 inside the cavity 40.

Figure 3B:
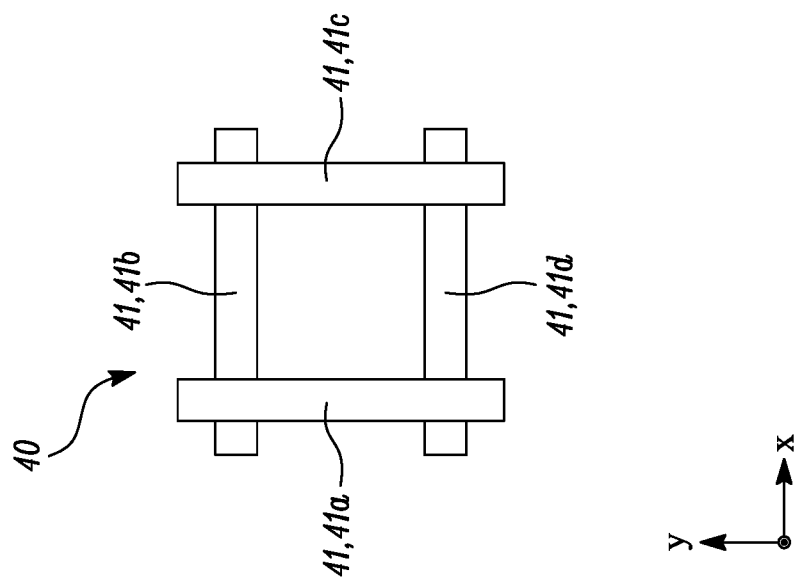
FIG. 3B illustrates a schematic top view of the cavity of the optical system, according to another embodiment of the present disclosure.
Figure 3A:
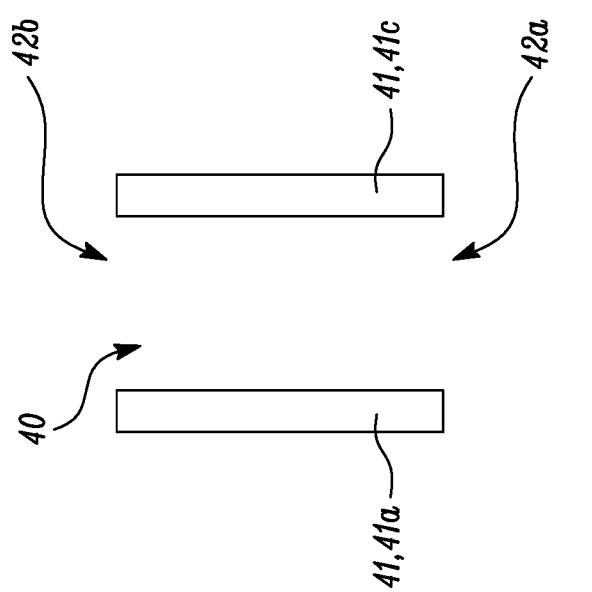
FIG. 3A illustrates a schematic sectional side view of a cavity of the optical system, according to an embodiment of the present disclosure.

FIG. 3A illustrates a schematic side view of the cavity 40, according to an embodiment of the present disclosure. In the illustrated embodiment of FIG. 3A, the cavity 40 includes two cavity walls 41a and 41c extending between the first and second open ends 42a, 42b of the cavity 40.

FIG. 3B illustrates a schematic top view of the cavity 40, according to another embodiment of the present disclosure. In the illustrated embodiment of FIG. 3B, the cavity 40 includes four cavity walls 41a, 41b, 41c, and 41d extending between the first and second open ends 42a, 42b (shown in FIG. 1) of the cavity 40. The four cavity walls 41a, 41b, 41c, and 41d may form a substantially rectangular shape of the cavity 40.

Figure 4A:
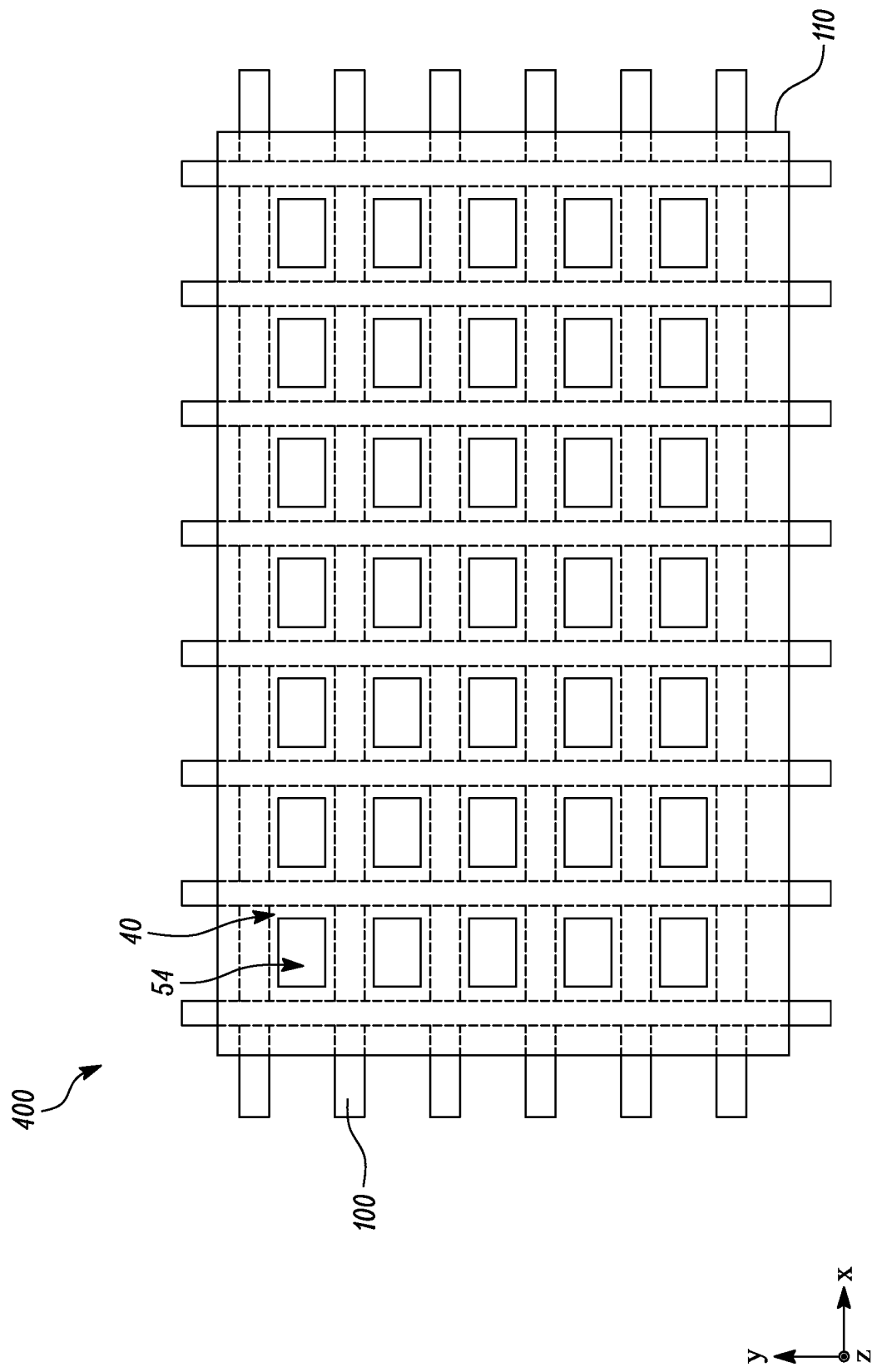
FIG. 4A illustrates a schematic top view of the optical construction of the optical system, according to an embodiment of the present disclosure.

FIG. 4A illustrates a schematic top view of the optical construction 400, according to an embodiment of the present disclosure. In the illustrated embodiment of FIG. 4A, the optical construction 400 includes the first optical component 100 including the plurality of spaced apart first optical cavities 40 arranged at least one-dimensionally and the second optical component 110 including the plurality of spaced apart second optical cavities 54. In the illustrated embodiment of FIG. 4A, the second optical component 110 is removably assembled to the first optical component 100 so that the second optical cavities 54 are inserted into the first optical cavities 40 in the one-to-one correspondence.

Figure 4C:
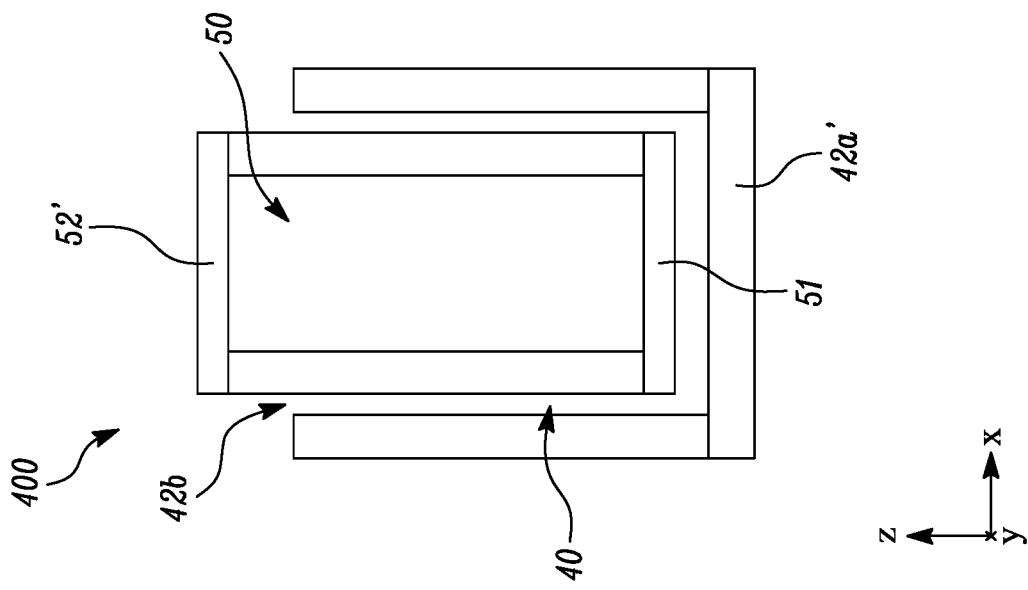
FIG. 4C illustrates a schematic sectional side view of the optical construction of the optical system, according to another embodiment of the present disclosure.
Figure 4B:
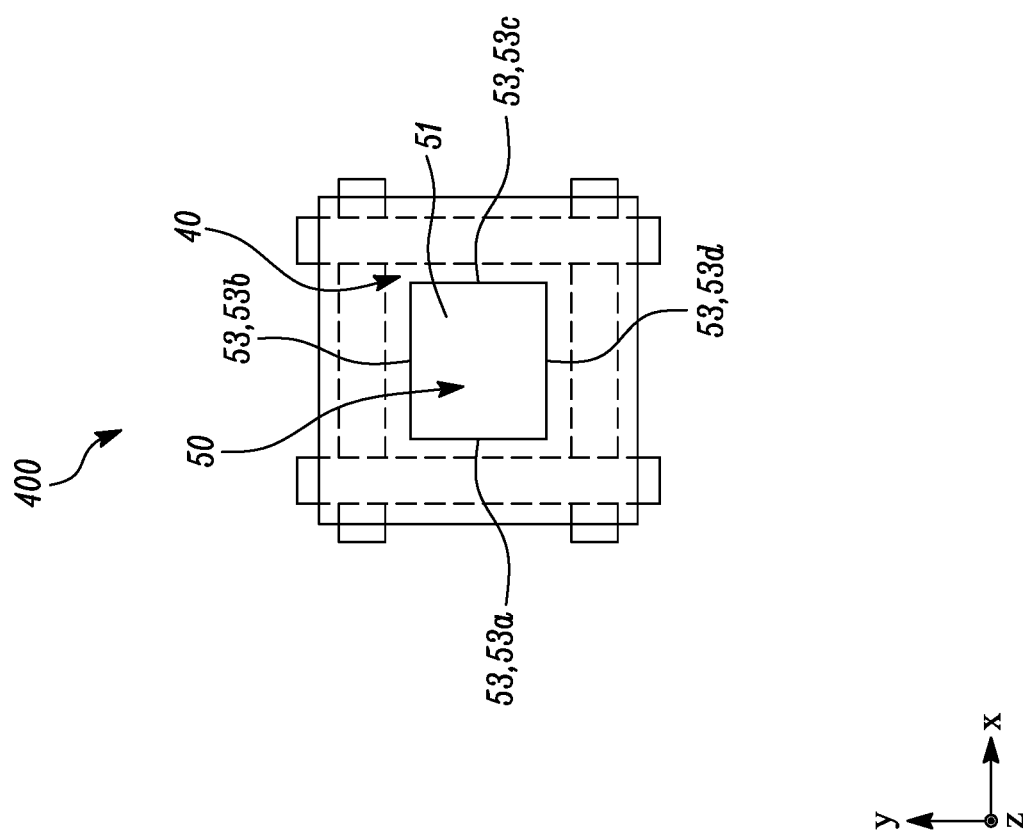
FIG. 4B illustrates a schematic top view of the optical construction of the optical system, according to another embodiment of the present disclosure.

FIG. 4B illustrates a schematic top view of the optical construction 400, according to another embodiment of the present disclosure. As shown in FIG. 4B, the optical construction 400 includes the first chamber 50 disposed inside the second chamber 40. Further, the first chamber 50 includes the closed first bottom 51 and the one or more first walls 53. In the illustrated embodiment of FIG. 4B, the one or more first walls 53 includes four first walls 53a, 53b, 53c, and 53d. Specifically, the closed first bottom 51 and the four first walls 53a, 53b, 53c, and 53d define the first chamber 50 for receiving the test sample 60 (shown in FIG. 1).

FIG. 4C illustrates a schematic side view of the optical construction 400, according to another embodiment of the present disclosure. In the illustrated embodiment of FIG. 4C, the first chamber 50 includes a first top 52' instead of the first top 52 (shown in FIG. 1). The first top 52' is closed. In some embodiments, the first top 52' may have similar optical properties as the front reflector 61. Further, the second chamber 40 includes a second bottom 42a' instead of the second bottom 42a (shown in FIG. 1). The second bottom 42a' is closed.

In some embodiments, for the substantially normally incident light having the first wavelength, the second bottom 42a' of the cavity 40 has an optical transmittance of greater than about 60%. Therefore, the second bottom 42a' of the cavity 40 may allow the light 30 to reach the test sample 60 (shown in FIG. 1). In some embodiments, for the substantially normally incident light having the second wavelength, the second bottom 42a' of the cavity 40 has an optical reflectance of greater than about 60%. Therefore, the second bottom 42a' of the cavity 40 may recycle the second light 71 emitted by the test sample 60 between the second bottom 42a', the cavity wall 41, and the first top 52' before exiting as the portion 72 of the second light 71. However, in some other embodiments, for the substantially normally incident light having the second wavelength, the second bottom 42a' of the cavity 40 has an optical transmittance of greater than about 60%. Therefore, the second bottom 42a' of the cavity 40 may allow the second light 71 emitted by the test sample 60 to reach the back reflector 23 and recycle between the back reflector 23, the cavity wall 41, and the first top 52' before exiting as the portion 72 of the second light 71.

Figure 5:
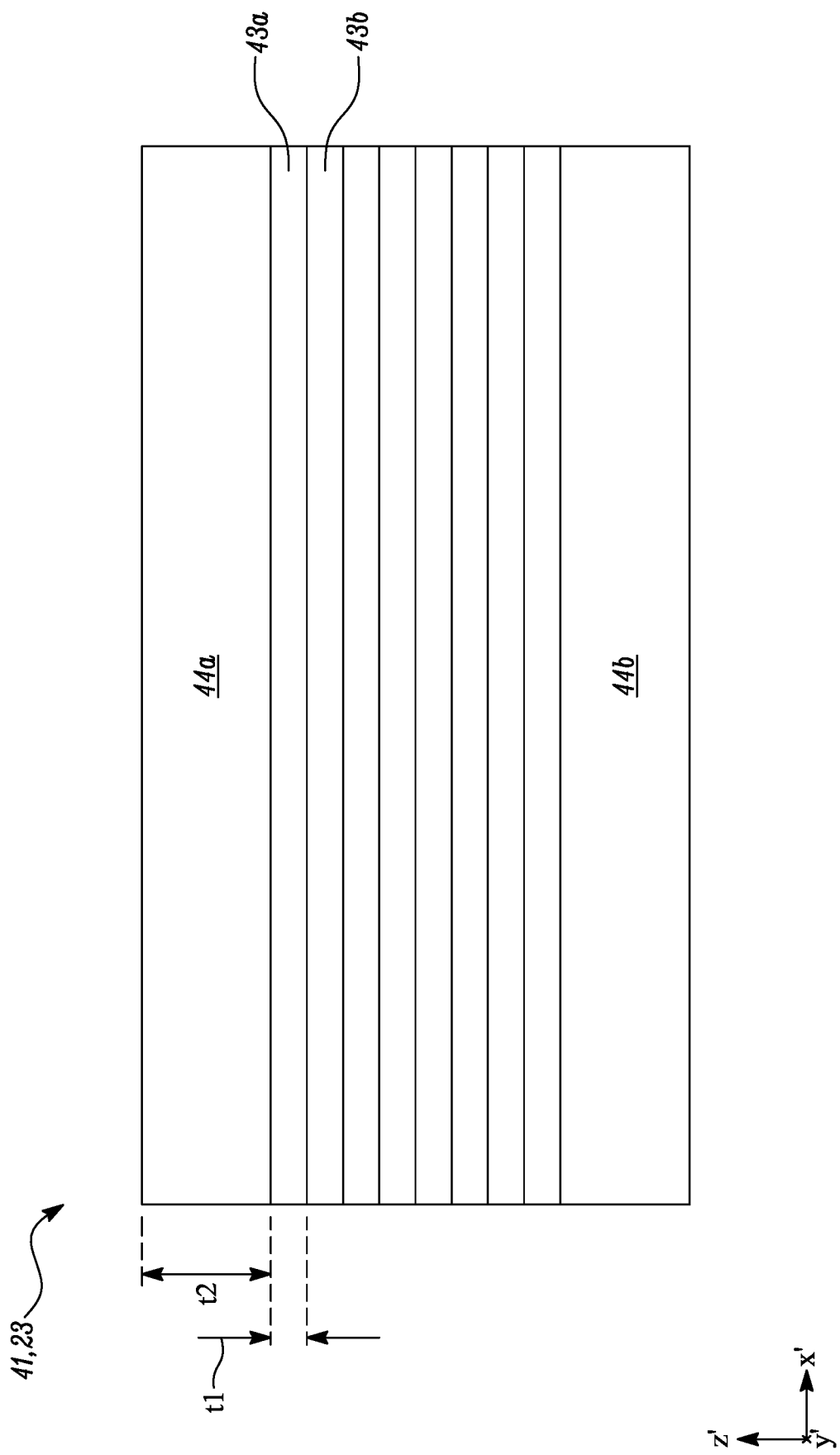
FIG. 5 illustrates a schematic sectional side view of a cavity wall and/or a back reflector of the optical system, according to an embodiment of the present disclosure.

FIG. 5 illustrates a detailed schematic sectional side view of the cavity wall 41 and/or the back reflector 23, according to an embodiment of the present disclosure.

The cavity wall 41 and/or the back reflector 23 define mutually orthogonal x'-, y'-, and z'-axes. The x'- and y'-axes correspond to in-plane axes of the cavity wall 41 and/or the back reflector 23, while the z'-axis is a transverse axis disposed along a thickness of the cavity wall 41 and/or the back reflector 23. In other words, the x'- and y'-axes are along a plane (i.e., x'-y' plane) of the cavity wall 41 and/or the back reflector 23, and the z'-axis is perpendicular to the plane of the cavity wall 41 and/or the back reflector 23, i.e., along the thickness of the cavity wall 41 and/or the back reflector 23.

In some embodiments, the cavity wall 41 includes a plurality of microlayers 43a, 43b. In the illustrated embodiment of FIG. 5, the cavity wall 41 includes a plurality of alternating first and second microlayers 43a, 43b. In some embodiments, the at least the portion of the one or more second walls 41 includes the plurality of microlayers 43a, 43b. In some embodiments, the plurality of microlayers 43a, 43b are disposed adjacent to each other along the z'-axis. The term "average thickness", as used herein, refers to an average of thicknesses measured at multiple points across a plane (i.e., the x'-y' plane) of each of the plurality of microlayers 43a, 43b. In some embodiments, the plurality of microlayers 43a, 43b number at least 5 in total. In some embodiments, the cavity wall 41 includes the plurality of microlayers 43a, 43b numbering at least 10, at least 20, at least 50, at least 100, at least 150, at least 200, or at least 300 in total.

In some embodiments, each of the microlayers 43a, 43b has an average thickness t1 of less than about 500 nm. The average thickness t1 is defined along the z-axis of each of the microlayers 55, 56. In some embodiments, each of the microlayers 43a, 43b has the average thickness t1 of less than about 450 nm, less than about 400 nm, less than about 350 nm, less than about 300 nm, less than about 250 nm, or less than about 200 nm.

In some embodiments, each of at least some of the microlayers 43a, 43b in the plurality of microlayers 43a, 43b has a first index of refraction nx1 along a first in-plane direction, a second index of refraction ny1 along a second in-plane direction, and a third index of refraction nz1 along a third direction orthogonal to the first and second directions. In some embodiments, the first in-plane direction may extend along the x'-axis, the second in-plane direction may extend along the y'-axis, and the third direction may extend along the z'-axis.

In some embodiments, at least two of nx1, ny1 and nz1 are different by at least 0.02 for at least one same visible wavelength in the visible wavelength range extending from about 420 nm to about 680 nm. In some embodiments, at least two of nx1, ny1 and nz1 are different by at least 0.05 or at least 0.1 for at least one same visible wavelength in the visible wavelength range. Therefore, in some embodiments, each of the at least some of the microlayers 43a, 43b in the plurality of microlayers 43a, 43b includes a birefringent material.

In some embodiments, each of at least some of the microlayers 43a, 43b in the plurality of microlayers 43a, 43b has a first index of refraction nx2 along the first in-plane direction, a second index of refraction ny2 along the second in-plane direction, and a third index of refraction nz2 along the third direction orthogonal to the first and second directions. In some embodiments, for at least one same visible wavelength in the visible wavelength range, a magnitude of a maximum difference between nx2, ny2 and nz2 is less than 0.02. In some embodiments, for at least one same visible wavelength in the visible wavelength range, the magnitude of the maximum difference between nx2, ny2 and nz2 is less than 0.015, less than 0.01, or less than 0.005. Therefore, in some embodiments, each of the at least some of the microlayers 43a, 43b in the plurality of microlayers 43a, 43b may include an isotropic material.

In some embodiments, the cavity wall 41 further includes a skin layer 44a, 44b. In the illustrated embodiment of FIG. 5, the cavity wall 41 includes two skin layers. The skin layer 44a, 44b has an average thickness t2 of greater than about 500 nm. The average thickness t2 is defined along the z'-axis of the skin layer 44a, 44b. In some embodiments, the skin layer 44a, 44b has the average thickness t2 of greater than about 600 nm, greater than about 700 nm, greater than about 800 nm, greater than about 900 nm, or greater than about 1000 nm. In some embodiments, the cavity wall 41 may contain a material having a low index of refraction in order to prevent the optical coupling between the one or more sidewall portions 53 of the optical well 50 and the cavity wall 41.

The skin layer 44a, 44b may act as a protective layer for the for the plurality of microlayers 43a, 43b. In the illustrated embodiment of FIG. 5, the cavity wall 41 includes a pair of opposing skin layers 44a, 44b. The skin layers 44a, 44b may act as protective boundary layers (PBL).

In some embodiments, the back reflector 23 may be substantially similar in construction to the cavity wall 41. In some embodiments, the back reflector 23 includes the plurality of microlayers 43a, 43b numbering at least 20 in total. In some embodiments, the back reflector 23 includes the plurality of microlayers 43a, 43b numbering at least 50, at least 100, at least 150, at least 200, or at least 300 in total. In some embodiments, at least one of the microlayers 43a, 43b of the back reflector 23 includes a metal. In some embodiments, the metal includes one or more of silver, gold, aluminum, and titanium.

Figure 6:
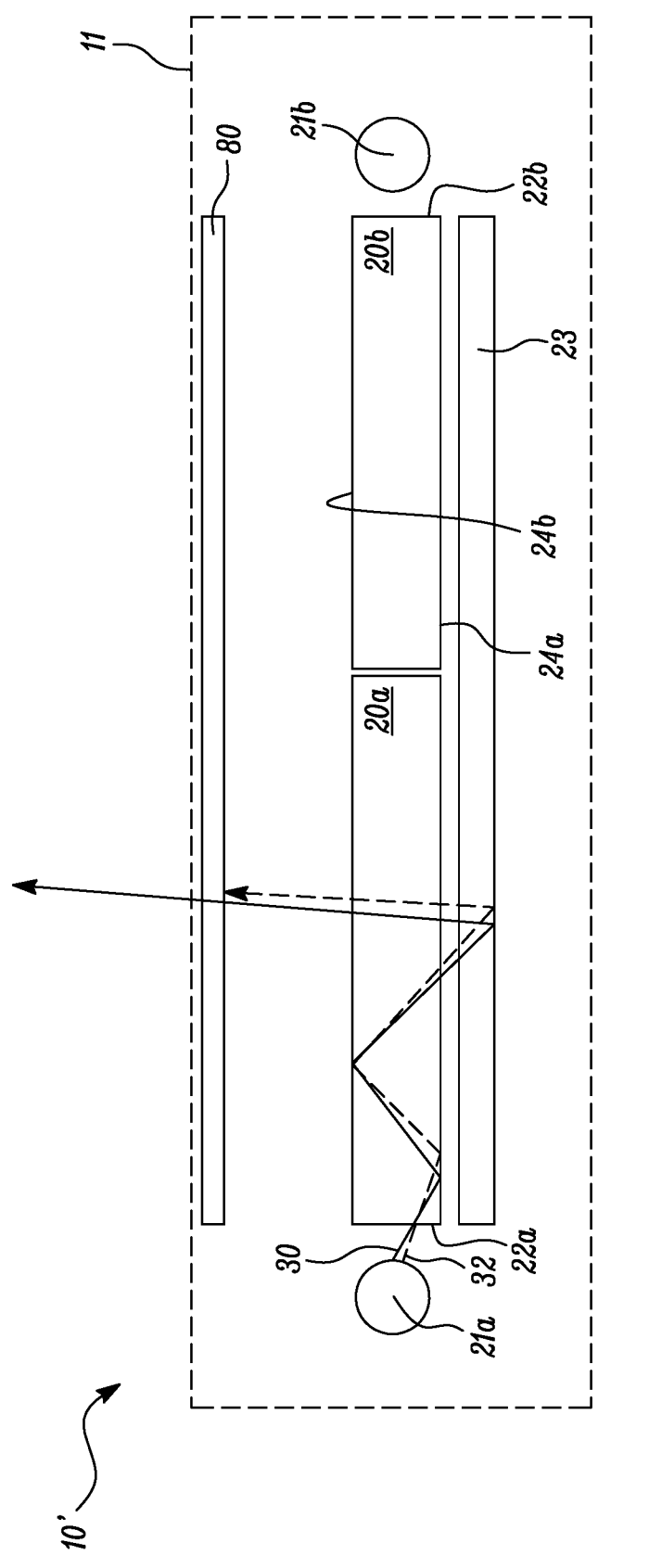
FIG. 6 illustrates a schematic sectional side view of an optical illumination system of the optical system, according to another embodiment of the present disclosure.

FIG. 6 illustrates a detailed schematic sectional side view of an optical illumination system 10', according to another embodiment of the present disclosure;

The optical illumination system 10' is substantially similar to the optical illumination system 10 shown in FIG. 1. However, the optical illumination system 10' further includes an optical filter 80 disposed between the emission surface 11 and the second major surface 24b of the at least one lightguide 20a, 20b.

In some embodiments, the emitted light 30, 32 has a plurality of wavelengths including the first wavelength. In some embodiments, the emitted light 30, 32 is substantially a white light.

For example, the emitted light 30, 32 includes the light 30 including the first wavelength and the light 32 including remaining wavelengths in the plurality of the wavelengths different from the first wavelength.

The optical filter 80 substantially transmits the light 30 having the first wavelength and substantially blocks the light 32 having the remaining wavelengths in the plurality of the wavelengths. In some embodiments, the optical filter 80 substantially blocks the light 32 having the remaining wavelengths by substantially absorbing the light 32. In some other embodiments, the optical filter 80 substantially blocks the light 32 having the remaining wavelengths by substantially reflecting the light 32.

Figure 7:
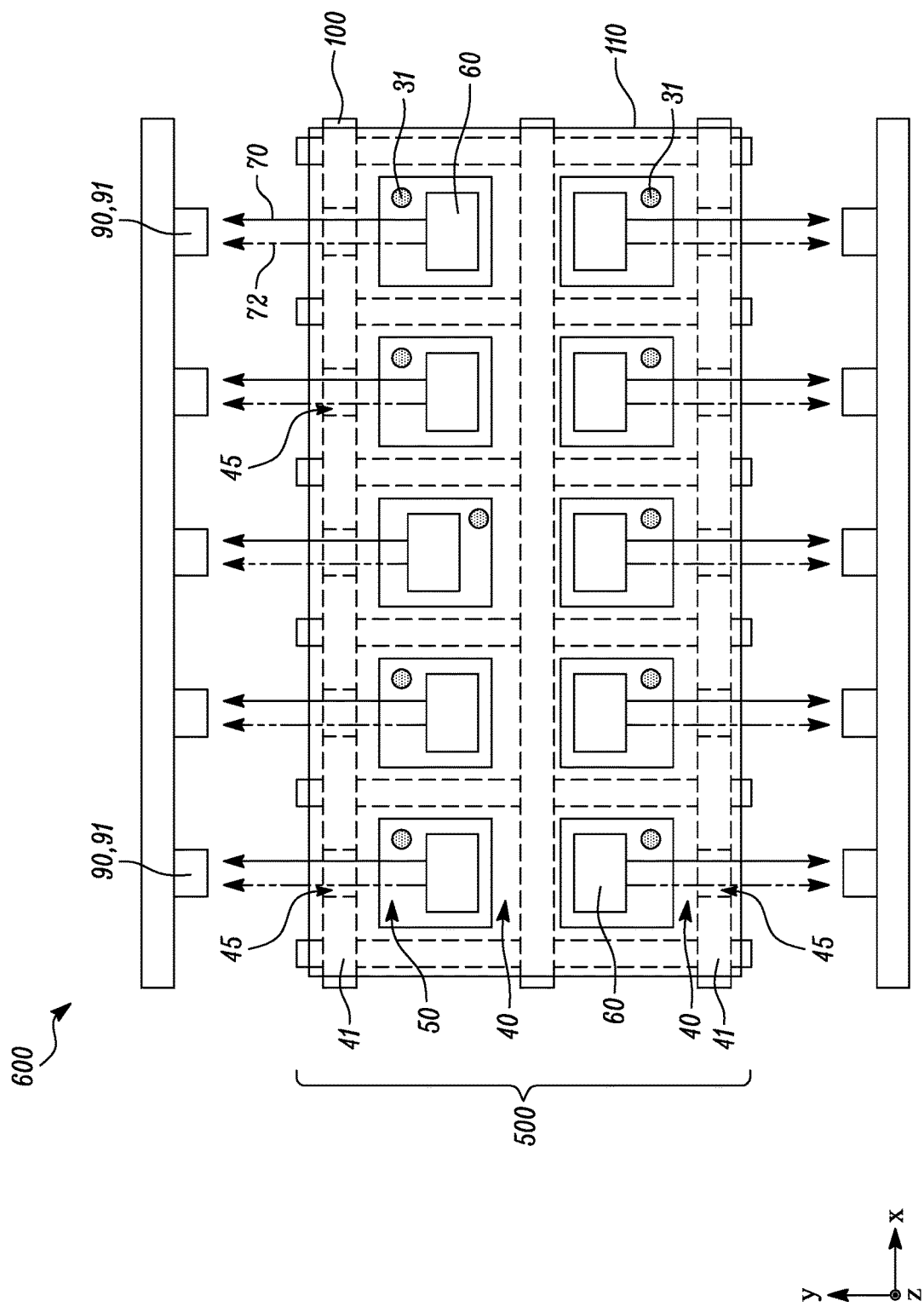
FIG. 7 illustrates a schematic top view of an optical system, according to another embodiment of the present disclosure.
Figure 8:
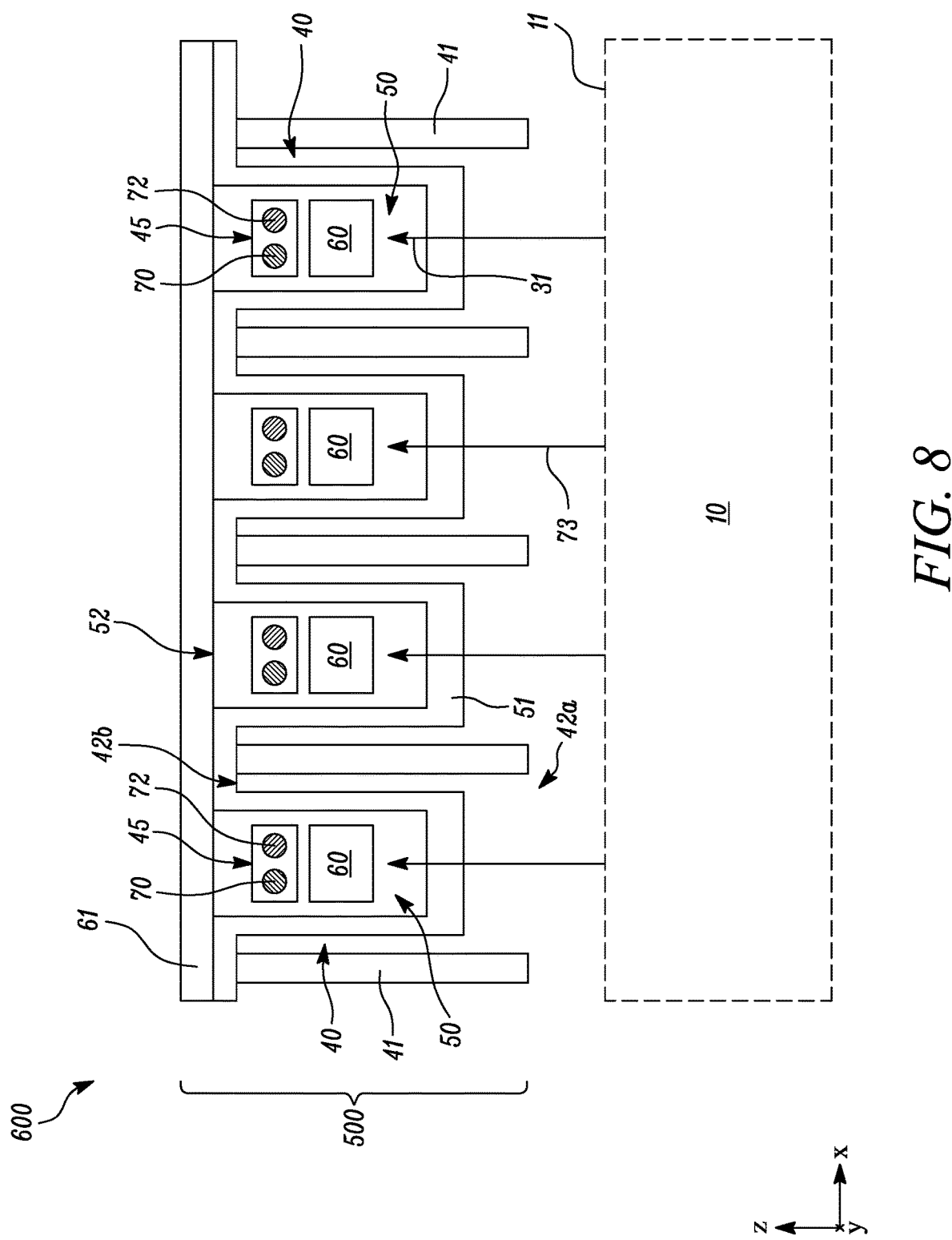
FIG. 8 illustrates a schematic sectional side view of the optical system of FIG. 7, according to an embodiment of the present disclosure.

FIG. 7 illustrates a detailed schematic top view of an optical system 600 without the cover 61, according to another embodiment of the present disclosure. FIG. 8 illustrates a schematic sectional side view of the optical system 600 with the cover 61, according to an embodiment of the present disclosure.

Referring to FIGS. 7 and 8, the optical system 600 includes an optical construction 500. The optical construction 500 is substantially similar to the optical construction 400. The optical construction 500 includes the integral material 110 shaped to include the plurality of first chambers 50 and assembled to the plurality of second chambers 40 so that the first chambers 50 are at least partially disposed inside the second chambers 40 in a one-to-one correspondence. The optical construction 500 further includes the cover 61 (shown in FIG. 8) extending across and substantially closing the open first tops 52 of the first chambers 50.

However, in the illustrated embodiment of FIGS. 7 and 8, the one or more sidewalls 41 of at least one of the second chambers 40 define an opening 45 therein between the open second top 42b and the second bottom 42a of the second chambers 40.

For the substantially normally incident light, for at least the first and second wavelengths, and for at least a first polarization state, each of the integral material 110 and the opening 45 in the one or more sidewalls 41 of the at least one of the second chambers 40 has an optical transmittance of greater than about 60% at each of the first and second wavelengths. In some embodiments, for the substantially normally incident light, for at least the first and second wavelengths, and for at least the first polarization state, each of the integral material 110 and the opening 45 in the one or more sidewalls 41 of the at least one of the second chambers 40 has the optical transmittance of greater than about 70%, greater than about 80%, or greater than about 90% at each of the first and second wavelengths. Therefore, each of the integral material 110 and the opening 45 in the one or more sidewalls 41 of the at least one of the second chambers 40 substantially transmits the substantially normally incident light, for at least the first and second wavelengths and for at least the first polarization state. In some embodiments, the first polarization state may be a p-polarization state. In some other embodiments, the first polarization state may be an s-polarization state. In some embodiments, the first polarization state may be a linear polarization state. In some other embodiments, the first polarization state may be a circular polarization state.

Further, for the substantially normally incident light, for at least the first and second wavelengths, and for at least the first polarization state, each of the cover 61 and the one or more sidewalls 41 of the second chambers 40 has an optical reflectance of greater than about 60% at each of the first and second wavelengths. In some embodiments, for the substantially normally incident light, for at least the first and second wavelengths, and for at least the first polarization state, each of the cover 61 and the one or more sidewalls 41 of the second chambers 40 has the optical reflectance of greater than about 70%, greater than about 80%, greater than about 90%, greater than about 95%, greater than about 98%, or greater than about 99% at each of the first and second wavelengths. Therefore, each of the cover 61 and the one or more sidewalls 41 of the second chambers 40 substantially reflects the substantially normally incident light, for at least the first and second wavelengths and for at least the first polarization state.

The optical system 600 further includes the illumination system 10. However, in some other embodiments, the optical system 600 may include the optical illumination system 10' (shown in FIG. 6).

The illumination system 10 is configured to emit light 73 (shown in FIG. 8) having the first wavelength and configured to enter the at least one of the second chambers 40 and the corresponding first chamber 50. The test sample 60 is configured to receive the at least the portion 31 of the light 73 exiting the illumination system 10 through the emission surface 11 (shown in FIG. 8). The optical system 600 further includes the detector 90, 91 configured to detect the light 70, 72 from, and transmitted by, the first chamber 50 after it passes through the opening 45 in the one or more sidewalls 41 of the at least one of the second chambers 40.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical system comprising:
an optical illumination system comprising:
   at least one lightguide;
   a light source disposed proximate a minor surface of the at least one lightguide and configured to emit light having at least a first wavelength;
   a back reflector disposed proximate a first major surface of the at least one lightguide; and
   an emission surface disposed proximate a second, opposite the first, major surface of the at least one lightguide, the emitted light exiting the optical illumination system through the emission surface of the optical illumination system;
a cavity disposed on the emission surface of the optical illumination system and comprising a cavity wall extending between opposite first and second open ends of the cavity, the first open end facing the emission surface and substantially covered by the back reflector;
an optical well disposed inside the cavity and comprising a bottom wall portion facing the back reflector, an open top portion proximate the second open end of the cavity, and one or more sidewall portions extending upwardly from the bottom wall portion to the open top portion of the optical well, the one or more sidewall portions and the cavity wall facing each other and defining a non-zero minimum gap therebetween, the bottom wall portion and the one or more sidewall portions defining a chamber for receiving a test sample, the test sample configured to receive at least a portion of the light exiting the optical illumination system through the emission surface and at least absorb a portion of the received light; and
a front reflector disposed on the cavity and substantially covering the second open end of the cavity and the open top portion of the optical well, wherein, for a substantially normally incident light having the first wavelength:
   each of the bottom wall portion and the one or more sidewall portions of the optical well has an optical transmittance of greater than about 60%; and
   each of the back reflector and the cavity wall has an optical reflectance of greater than about 60%.

2. The optical system of claim 1, wherein the emitted light has a plurality of wavelengths including the first wavelength, and wherein the optical illumination system comprises an optical filter disposed between the emission surface and the second major surface of the at least one lightguide, the optical filter substantially transmitting light having the first wavelength and substantially blocking light having the remaining wavelengths in the plurality of the wavelengths.

3. The optical system of claim 1, further comprising an optical detector configured to detect a portion of the light exiting the optical illumination system through the emission surface and transmitted by the test sample and the front reflector.

4. The optical system of claim 1, wherein the front reflector transmits a portion of the light exiting the optical illumination system through an opening defined therein.

5. The optical system of claim 1, wherein the front reflector transmits a portion of the light exiting the optical illumination system through an opening defined therein.

6. The optical system of claim 1, wherein the test sample is further configured to convert at least a portion of the received light to a second light having at least a second wavelength different from the first wavelength, the front reflector transmitting at least a portion of the second light.

7. The optical system of claim 6, wherein the front reflector transmits at least the portion of the second light through an opening defined therein.

8. The optical system of claim 6, wherein for a substantially normally incident light having the at least the second wavelength, each of the bottom wall portion and the one or more sidewall portions of the optical well and the front reflector, has an optical transmittance of greater than about 60%.

9. The optical system of claim 1, wherein the optical well is removably assembled to the cavity.

10. The optical system of claim 1, wherein the cavity wall comprises a plurality of microlayers numbering at least 5 in total, each of the microlayers having an average thickness of less than about 500 nm.

11. The optical system of claim 1, wherein the non-zero minimum gap between the one or more sidewall portions and the cavity wall is filled mostly with air.

12. An optical construction comprising:
- a first optical component comprising a plurality of spaced apart first optical cavities arranged at least one-dimensionally and comprising:
  - first open tops at a same top side of the first optical component;
  - opposing first bottoms at a same bottom, opposite the top, side of the first optical component; and
  - one or more first sidewalls extending from the first bottoms to the first open tops; and
- a second optical component comprising a plurality of spaced apart second optical cavities comprising:
  - second open tops at a same top side of the second optical component;
  - opposing second closed bottoms at a same bottom, opposite the top, side of the second optical component; and
  - one or more second sidewalls extending from the second closed bottoms to the second open tops,
- the second optical component removably assembled to the first optical component so that the second optical cavities are inserted into the first optical cavities in a one-to-one correspondence, wherein for each corresponding first and second optical cavities:
  - the second open top of the second optical cavity is adjacent the first open top of the first optical cavity;
  - the second closed bottom of the second optical cavity faces the first bottom of the first optical cavity; and
  - the one or more second sidewalls of the second optical cavity and the one or more first sidewalls of the first optical cavity face each other and define a non-zero minimum gap therebetween.

13. An optical system comprising the optical construction of claim 12 disposed on, and substantially co-extensive with, an emission surface of an optical illumination system, the first bottoms and the second closed bottoms disposed between the emission surface and the first and second open tops, the illumination system configured to inject light into the second optical cavities through the emission surface.

14. An optical construction comprising an integral material shaped to include a plurality of first chambers and assembled to a plurality of second chambers so that the first chambers are at least partially disposed inside the second chambers in a one-to-one correspondence, the first chambers comprising open first tops and opposing closed first bottoms, a cover extending across and substantially closing the open first tops of the first chambers, the second chambers comprising open second tops proximate corresponding open first tops, opposing second bottoms proximate corresponding closed first bottoms, and one or more sidewalls extending from the second bottoms to the open second tops, the one or more sidewalls of at least one of the second chambers defining an opening therein between the open second top and the second bottom of the second chambers,
- such that for a substantially normally incident light, for at least first and second wavelengths, and for at least a first polarization state:
  - each of the integral material and the opening in the one or more sidewalls of the at least one of the second chambers has an optical transmittance of greater than about 60% at each of the first and second wavelengths; and
  - each of the cover and the one or more sidewalls of the second chambers has an optical reflectance of greater than about 60% at each of the first and second wavelengths.

15. An optical system comprising:
- the optical construction of claim 14;
- an illumination system configured to emit light having the first wavelength and configured to enter the at least one of the second chambers and the corresponding first chamber; and
- a detector configured to detect light from, and transmitted by, the first chamber after it passes through the opening in the one or more sidewalls of the at least one of the second chambers.

* * * * *